(12) United States Patent
Takahashi

(10) Patent No.: US 7,146,041 B2
(45) Date of Patent: Dec. 5, 2006

(54) METHOD AND APPARATUS FOR CORRECTING WHITE BALANCE, METHOD FOR CORRECTING DENSITY AND RECORDING MEDIUM ON WHICH PROGRAM FOR CARRYING OUT THE METHODS IS RECORDED

(75) Inventor: Koji Takahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 501 days.

(21) Appl. No.: 10/290,335

(22) Filed: Nov. 8, 2002

(65) Prior Publication Data

US 2003/0090750 A1    May 15, 2003

(30) Foreign Application Priority Data

| Nov. 8, 2001 | (JP) | ............................. 2001-343256 |
| Jan. 31, 2002 | (JP) | ............................. 2002-022966 |
| Feb. 1, 2002 | (JP) | ............................. 2002-025304 |

(51) Int. Cl.
*G06K 9/00* (2006.01)

(52) U.S. Cl. .................. 382/167; 382/166; 358/518; 348/223.1

(58) Field of Classification Search ................ 382/167, 382/166, 248; 358/516, 518; 348/225.1, 348/224.1, 223.1, 223, 231.6, 222.1, 231.16; 362/293, 17, 18, 318
See application file for complete search history.

(56) References Cited

U.S. PATENT DOCUMENTS

| 4,203,671 A | 5/1980 | Takahashi et al. |
| 5,168,303 A * | 12/1992 | Ikenoue et al. ................ 355/38 |
| 6,160,579 A * | 12/2000 | Shiraiwa et al. .......... 348/224.1 |
| 6,529,630 B1 * | 3/2003 | Kinjo .......................... 382/190 |
| 6,545,710 B1 * | 4/2003 | Kubo et al. .............. 348/223.1 |
| 6,947,080 B1 * | 9/2005 | Ikeda ....................... 348/223.1 |
| 2001/0019620 A1 * | 9/2001 | Nagai et al. ................. 382/104 |
| 2003/0007687 A1 * | 1/2003 | Nesterov et al. ............ 382/167 |
| 2003/0098916 A1 * | 5/2003 | Noguchi ..................... 348/272 |

FOREIGN PATENT DOCUMENTS

| EP | 0 530 793 A2 | 3/1993 |
| EP | 0 658 058 A2 | 6/1995 |
| EP | 1 185 082 A2 | 3/2002 |
| JP | 2001-103508 A | 4/2001 |

\* cited by examiner

*Primary Examiner*—Jingge Wu
*Assistant Examiner*—Ali Bayat
(74) *Attorney, Agent, or Firm*—Sughrue Mion, PLLC

(57) ABSTRACT

The white balance correction method and apparatus estimate a color temperature of a photographing light source with which a color image has been taken by using at least gray and/or skin color information contained in an input color image and correct image signals of the color image based on the estimated color temperature. The density correction method multiplies image signals of respective pixels in an input color image by set coefficients to detect pixels having the multiplied image signals in the vicinity of a blackbody locus curve of skin color as skin color candidate pixels and assigns an average obtained for predetermined color signals from the skin color candidate pixels detected to a predetermined density of a color corresponding to the color signals on a print. The recording medium on which one or both of the white balance correction method and the density correction method are recorded in a computer-readable manner as a program to be executed by a computer.

19 Claims, 7 Drawing Sheets

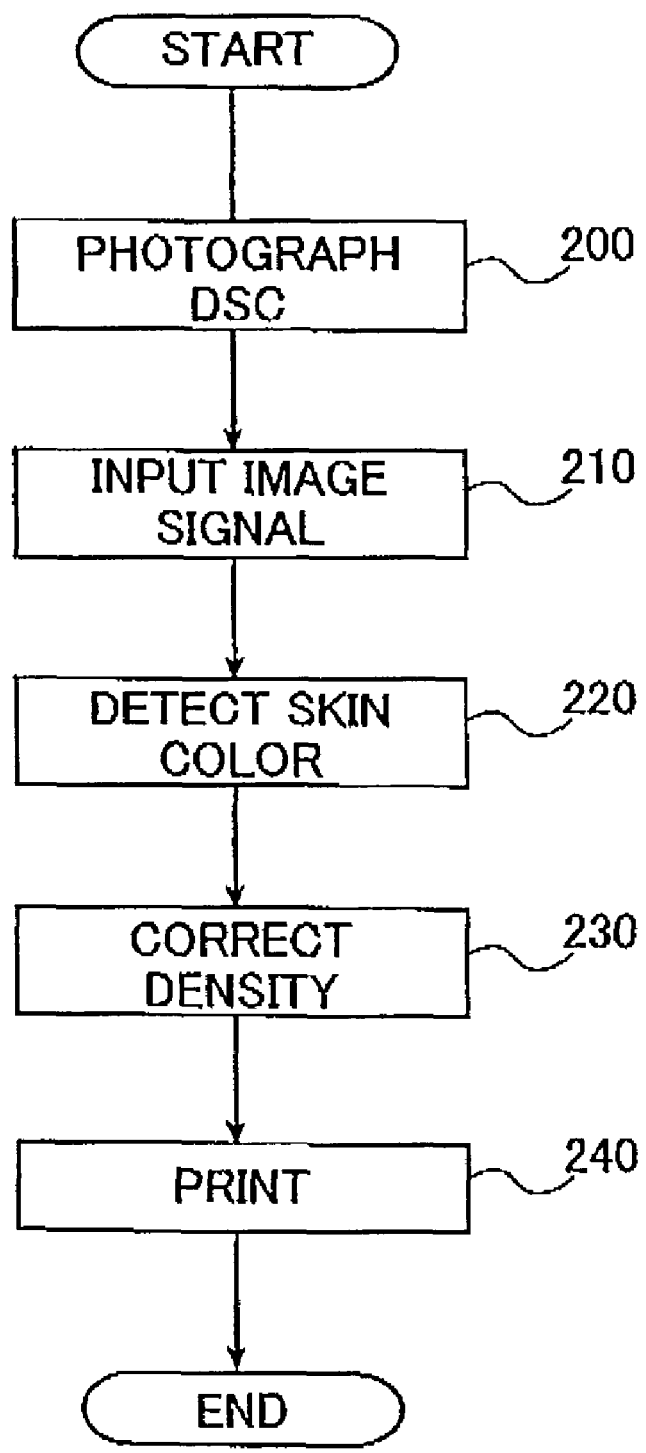

METHOD AND APPARATUS FOR CORRECTING WHITE BALANCE, METHOD FOR CORRECTING DENSITY AND RECORDING MEDIUM ON WHICH PROGRAM FOR CARRYING OUT THE METHODS IS RECORDED

BACKGROUND OF THE INVENTION

1. Field of the Invention

The present invention relates to a technique for correcting white balance and density of a color image when digital image processing is performed on an input image signal to form a photographic print, more particularly, to a method and an apparatus for correcting white balance, a method for correcting density and a recording medium on which a program for carrying out these methods is recorded.

2. Description of the Related Art

The conventional silver salt photography generally uses an analog exposure (area exposure or direct exposure) system to obtain a print. That is, a developed negative film is positioned at a predetermined printing position and irradiated with light from a white light source (halogen lamp or the like), and light transmitted through the negative film is imaged on photographic paper, thus making an exposure.

In recent years, printing apparatuses using digital exposure, i.e., digital photoprinters, have been put to practical use. Digital photoprinters perform a process in which an image recorded on a photographic film such as a negative film or a color reversal film is photoelectrically read to obtain a digital signal representing the read image, various kinds of image processing is performed on the digital signal to obtain image data for the recording purposes, scanning exposure using recording light modulated according to this image data is performed on a photosensitive material to form an image (latent image) on the photosensitive material to obtain a (finished) print.

Such digital photoprinters process images as digital image data and can therefore perform image processing not only on photographed images on photographic films but also on images photographed with digital still cameras (DSC) or the like, image data recorded in the form of digital data on various kinds of recording media, e.g., magnetic recording media, such as CD-R, flexible disks, and removable hard disks (Zip, Jaz, etc.), and MO disks (magneto-optical recording media) to output prints.

Color negative films have been commonly used by typical users. The conditions of photography of original images on negative films are not always uniform. For example, subjects are photographed in light from various light sources, e.g., daylight and fluorescent lamp. Therefore, in case of forming prints from a developed negative film when images in the developed negative film is printed without changing the characteristics of light from a printing light source, color tints of light from photographing light sources in which subjects have been photographed are directly reflected in the prints, which leads to forming undesirable prints in some cases.

Various systems have therefore been contrived to adjust white balance on the prints. A typical example of such systems is a large area transmission density (LATD) method based on the Evans' theorem (hypothesis) stating that the average of all colors in the world is gray. The LATD is the average transmission density through an entire frame on a photographic film. In the LATD method, the LATD of each frame on a color negative film is measured and the characteristics of light from a printing light source are changed according to the red, green, and blue density levels so that the average color on the print is made close to gray.

On the other hand, digital still cameras (DSCS) have recently come into widespread use. An image forming process in a DSC and an image forming process using a color negative film can be regarded as the same with respect to photographing a scene but differ essentially in that a DSC image itself is an object of appreciation while an image on a color negative film is not directly viewed as an object of appreciation. DSC images themselves, therefore, must be fine, well-white-balanced images when viewed before being output as prints. DSCs are also used for photography with various light sources like cameras using color negative films and are unable to reliably obtain a satisfactory image without a function for correcting white balance. Therefore almost all the recent DSCs have an auto white balance (AWB) function for automatically correcting white balance.

The above-described LATD method has been practiced with some measure of success but it is responsible for production of undesirable prints. One of the printing failures due to the LATD method is color failure that imbalance of a color occurs in a print. For example, in a case where white balance correction based on the LATD method is made on an image obtained by photographing a woman in red dress, a cyan color, which is a complementary color to red, is added throughout the entire frame to make the entire frame close to gray, thereby reducing the vividness of the red of the dress and making the woman's face pale.

In a case where the entire frame area of a photographed scene is reddish, it is impossible to ascertain whether the reddishness is ascribable to the light source or the subject. In this case, the LATD method achieves success in correction if the light source is the cause, but it causes such a color failure described above if the subject is the cause.

The above-mentioned AWB function of DSCs is essentially based on the Evans' theorem like the negative film/printing system and entails the same problem as that of white balance correction based on the LATD in the negative film/printing system.

That is, while about 60 to 70% of DSC images after AWB are obtained as well-color-balanced good images as average performance of the Evans' theorem, the remaining 30 to 40% of the DSC images need some additional color balance correction because of AWB function failure. If white balancing is not performed at the time of printing from the DSC images, about 30 to 40% of resulting prints are unsatisfactory, unacceptable prints.

As described above, the conventional art LATD method based on the Evans' theorem makes white balance correction by assuming that the average of colors through the entire frame of an image is gray, but it is not sufficiently effective in correcting white balance because of its inability to find true gray in an image, and often produces a contrary correction effect.

Further, when printing, if LATD method as above is employed to perform density correction through the entire image, the density of a principal subject in the image will be influenced by scene configurations and a print may be formed with an improper density. In order to overcome such a problem, it has been proposed to detect a principal subject (a human face in many cases) in an image and determine the print density in accordance with the density of the detected subject. The judgment on whether or not the print density is proper is made based on the density of a principal subject rather than the density through an entire frame. Consequently, it is important to detect a human face as a principal subject and correct the density of the entire image so that the density of the face may be proper.

Detection of a human face as a principal subject is generally performed employing shape recognition. However, it is very difficult at present to detect human faces with high accuracy by employing such measures. It has also been attempted to detect human faces using color information, where difficulties may again occur, if the type of a light source is unknown.

SUMMARY OF THE INVENTION

The present invention has been devised in view of the above-mentioned problem of the prior art and, it is a first object of the present invention to provide a method and an apparatus for white balance correction, which is a technique for realizing white balance correction appropriately and with high yield in applying digital image processing to inputted image data to form prints, and a recording medium having recorded therein a program for executing this program.

In addition, the present invention has been devised in view of the above-mentioned problem of the prior art and, it is a second object of the present invention to provide a method and an apparatus for density correction, which is a technique for detecting an area of skin color out of an image to obtain an appropriate print density based on information on the area of skin color if a light source is unknown, and a recording medium having recorded therein a program for executing this method.

In order to attain the first object, the first aspect of the present invention provides a white balance correction method, comprising the steps of estimating, by using at least gray and/or skin color information contained in an input color image, a color temperature of a photographing light source with which the color image has been taken, and correcting image signals of the color image based on the estimated color temperature.

Preferably, only the gray and skin color information is used when correcting the image signals of the color image.

Preferably, the estimating step includes multiplying the image signals of respective pixels in the input color image by set coefficients, setting pixels having the multiplied image signals in the vicinity of a blackbody locus curve of skin color as skin color candidate pixels and/or pixels having the multiplied image signals in the vicinity of a blackbody locus curve of gray as gray candidate pixels, optimizing the set coefficients so that the number of the skin color candidate pixels and/or the gray candidate pixels is maximized, obtaining a group of skin color candidate pixels and/or a group of gray candidate pixels by using the optimized set coefficients, and estimating the color temperature of the photographing light source from an average color temperature of the group of skin color candidate pixels and/or an average color temperature of the group of gray candidate pixels, and wherein the image signals of the color image multiplied by the optimized set coefficients are corrected by an amount corresponding to a difference between the estimated color temperature and a color temperature of reference white.

Preferably, the color temperature of the photographing light source is estimated from the average color temperature of the group of skin color candidate pixels and the average color temperature of the group of gray candidate pixels obtained by optimizing the set coefficients so that the number of the skin color candidate pixels and the gray candidate pixels is maximized.

Preferably, the estimating step includes multiplying the image signals of respective pixels in the input color image by set coefficients, setting pixels having the multiplied image signals in the vicinity of a blackbody locus curve of skin color as skin color candidate pixels and pixels having the multiplied image signals in the vicinity of a blackbody locus curve of gray as gray candidate pixels, optimizing the set coefficients so that a difference between an average color temperature of the skin color candidate pixels and an average color temperature of the gray candidate pixels is minimized, obtaining a group of skin color candidate pixels and a group of gray candidate pixels by using the optimized set coefficients, and estimating the color temperature of the photographing light source from the average color temperature of the group of skin color candidate pixels and the average color temperature of the group of gray candidate pixels, and wherein the image signals of the color image multiplied by the optimized set coefficients are corrected by an amount corresponding to a difference between the estimated color temperature and a color temperature of reference white.

Preferably, the estimating step includes multiplying the image signals of respective pixels in the input color image by set coefficients, setting pixels having the multiplied image signals in the vicinity of a blackbody locus curve of skin color as skin color candidate pixels and pixels having the multiplied image signals in the vicinity of a blackbody locus curve of gray as gray candidate pixels, optimizing the set coefficients so that the number of the skin color candidate pixels and/or the gray candidate pixels is maximized and a difference between an average color temperature of the skin color candidate pixels and an average color temperature of the gray candidate pixels is minimized, obtaining a group of skin color candidate pixels and a group of gray candidate pixels by using the optimized coefficients, and estimating the color temperature of the photographing light source from the average color temperatures of the group of skin color candidate pixels and the group of gray candidate pixels, and wherein the image signals of the color image multiplied by the optimized set coefficients are corrected by an amount corresponding to a difference between the estimated color temperature and a color temperature of reference white.

Preferably, the estimating step includes multiplying the image signals of respective pixels in the input color image by set coefficients, setting pixels having the multiplied image signals in the vicinity of blackbody locus curve of skin color as skin color candidate pixels and pixels having the multiplied image signals in the vicinity of a blackbody locus curve of gray as gray candidate pixels, optimizing the set coefficients so that the number of the skin color candidate pixels and/or gray candidate pixels is maximized and a difference between an average color temperature of the group of skin color candidate pixels and the group of gray candidate pixels is minimized, obtaining a group of skin color candidate pixels and a group of gray candidate pixels by using the optimized coefficients, dividing the group of skin color candidate pixels into a plurality of subgroups of skin color candidate pixels and dividing the group of gray candidate pixels into a plurality of subgroups of gray candidate pixels, and estimating a color temperature of the photographing light source from an average color temperature of a subgroup of skin color candidate pixels with a high average color temperature among the plurality of subgroups of skin color candidate pixels and an average color temperature of a subgroup of gray candidate pixels with a high average color temperature among the plurality of subgroups of gray candidate pixels, and wherein the color image signals multiplied by the optimized coefficients are corrected by a difference between the estimated color temperature and a color temperature of reference white.

Preferably, the estimating step includes multiplying the image signals of respective pixels in the input color image by set coefficients, setting pixels having the multiplied image signals in the vicinity of blackbody locus curve of skin color as skin color candidate pixels and pixels having the multiplied image signals in the vicinity of a blackbody locus curve of gray as gray candidate pixels, optimizing firstly the set coefficients so that the number of the skin color candidate pixels and the gray candidate pixels is maximized and a difference between an average color temperature of the group of skin color candidate pixels and an average color temperature of the group of gray candidate pixels is minimized, estimating a first color temperature of the photographing light source from the average color temperature of a group of skin color candidate pixels and the average color temperature of a group of gray candidate pixels obtained by the first optimization, optimizing secondly the set coefficients so that the number of the gray candidate pixels is maximized and a difference between an average color temperature of the group of skin color candidate pixels and an average color temperature of the group of gray candidate pixels is minimized, and estimating a second color temperature of the photographing light source from the average color temperature of a group of skin color candidate pixels and the average color temperature of a group of gray candidate pixels obtained by the second optimization, and wherein the color image signals multiplied by the optimized coefficients are corrected by using both a first white balance correction signal and a second white balance correction signal, the first white balance correction signal being adapted for correcting the color image signals by a difference between the first estimated color temperature and a color temperature of reference white, and the second white balance correction signal being adapted for correcting them by a difference between the second estimated color temperature and a color temperature of reference white.

Preferably, the estimating step includes multiplying the image signals of respective pixels in the input color image by set coefficients, setting pixels having the multiplied image signals in the vicinity of blackbody locus curve of skin color as skin color candidate pixels and pixels having the multiplied image signals in the vicinity of a blackbody locus curve of gray as gray candidate pixels, optimizing firstly the set coefficients so that the number of the gray candidate pixels is maximized and a difference between an average color temperature of the group of skin color candidate pixels and an average color temperature of the group of gray candidate pixels is minimized, estimating a first color temperature of the photographing light source from the average color temperature of a group of skin color candidate pixels and the average color temperature of a group of gray candidate pixels obtained by the first optimization, optimizing secondly the set coefficients so that the number of the skin color candidate pixels is maximized and a difference between an average color temperature of the group of skin color candidate pixels and an average color temperature of the group of gray candidate pixels is minimized, estimating a second color temperature of the photographing light source from the average color temperature of a group of skin color candidate pixels and the average color temperature of a group of gray candidate pixels obtained by the second optimization, and wherein the color image signals multiplied by the optimized coefficients are corrected by using both a first white balance correction signal and a second white balance correction signal, the first white balance correction signal being adapted for correcting the color image signals by a difference between the first estimated color temperature and a color temperature of reference white, and the second white balance correction signal being adapted for correcting them by a difference between the second estimated color temperature and a color temperature of reference white.

Preferably, the image signals of respective pixels in the input color image are multiplied by set coefficients and, as a result of the multiplication, when the coefficients are optimized so that a set objective function is minimized, a maximum value of the image signal of the input image is detected, and an image signal is used which is standardized so that the maximum value of the image signal becomes 1.0 by dividing each image signal of the input image by the maximum value.

Preferably, when each of the blackbody locus curve of skin color and the blackbody locus curve of gray is set, a spectral sensitivity of a photographing apparatus used to form the input color image is used as a spectral sensitivity distribution.

Preferably, when each of the blackbody locus curve of skin color and the blackbody locus curve of gray is set, a spectral sensitivity of BT709 is used as a spectral sensitivity distribution.

Moreover, in order to attain the first object described above, the second aspect of the present invention provides a white balance correction apparatus for correcting white balance when digital image processing is performed on an input color image to form a print, comprising means for estimating, by using at least gray and/or skin color information contained in the input color image, a color temperature of a photographing light source with which the color image has been taken, and means for correcting image signals of the color image based on the estimated color temperature.

Preferably, the means for estimating a color temperature of the photographing light source includes means for multiplying the image signals of respective pixels in the input color image by set coefficients, skin color candidate pixel detection means for detecting pixels having image signals in the vicinity of a blackbody locus curve of skin color as a result of the multiplication and gray candidate pixel detection means for detecting pixels having image signals in the vicinity of a blackbody locus curve of gray as a result of the multiplication, means for optimizing the coefficients so that the number of the skin color candidate pixels and/or the number of the gray candidate pixels are maximized and a difference between an average color temperature of the group of skin color candidate pixels and an average temperature of the group of gray candidate pixels is minimized, and means for computing a color temperature of the photographing light source from the average color temperature of the group of skin color candidate pixels and the average color temperature of the group of gray candidate pixels, and wherein the means for correcting an image signal of the color image is means for correcting the color image signals multiplied by the optimized coefficients by a difference between the estimated color temperature and a color temperature of reference white.

Preferably, the means for estimating a color temperature of the photographing light source includes coefficient multiplication means for multiplying the image signals of respective pixels in the input color image by set coefficients, skin color candidate pixel detection means for detecting pixels having the multiplied image signals in the vicinity of a blackbody locus curve of skin color as a result of the multiplication, and gray candidate pixel detection means for detecting pixels having the multiplied image signals in the vicinity of a blackbody locus curve of gray as a result of the multiplication, optimization means for optimizing the set coefficients so that the number of the skin color candidate pixels and the number of the gray candidate pixels are maximized and a difference between an average color temperature of the skin color candidate pixels and an average color temperature of the gray candidate pixels is minimized, and color temperature estimating and computing means for estimating the color temperature of the photographing light source for a group of skin color candidate pixels and a group of gray candidate pixels obtained by optimizing the set coefficients by the optimization means for optimizing the set coefficients in which the group of skin color candidate pixels is divided into a plurality of subgroups of skin color candidate pixels and the group of gray candidate pixels is divided into a plurality of subgroups of gray candidate pixels, and a color temperature of the photographing light source is estimated from an average color temperature of a subgroup of skin color candidate pixels with a high average color temperature among the plurality of subgroups of skin color candidate pixels and an average color temperature of a subgroup of gray candidate pixels with a high average color temperature among the plurality of subgroups of gray candidate pixels, and wherein the means for correcting the image signals of the color image is means for correcting the image signals of the color image multiplied by the optimized set coefficients by an amount corresponding to a difference between the estimated color temperature and a color temperature of reference white.

Further, in order to attain the second object described above, the third aspect of the present invention provides a density correction method, comprising the steps of multiplying image signals of respective pixels in an input color image by set coefficients to detect pixels having the multiplied image signals in the vicinity of a blackbody locus curve of skin color as skin color candidate pixels, and assigning an average obtained for predetermined color signals from the skin color candidate pixels detected to a predetermined density of a color corresponding to the color signals on a print.

Preferably, the predetermined color signals are G signals and an average G signal obtained from the skin color candidate pixels detected is assigned to a predetermined C density on a print. Here, preferably, the predetermined G density is 0.7 to 1.0.

And, in order to attain the first and second objects described above, the fourth aspect of the present invention provides a recording medium on which one or both of a white balance correction method according to each of the above-mentioned first aspect of the present invention and a density correction method according to each of the above-mentioned third aspect of the present invention are recorded in a computer-readable manner as a program to be executed by a computer.

BRIEF DESCRIPTION OF THE DRAWINGS

In the accompanying drawings:

FIG. 7 is a flowchart showing a flow of processing in the second embodiment of the present invention.

DETAILED DESCRIPTION OF THE PREFERRED EMBODIMENTS

The method and apparatus for correcting white balance and the method for correcting density, as well as the recording medium on which a program for carrying out these methods is recorded, all of which the present invention provides, will be described below in detail with reference to preferred embodiments of the invention shown in the accompanying drawings.

Figure 1:
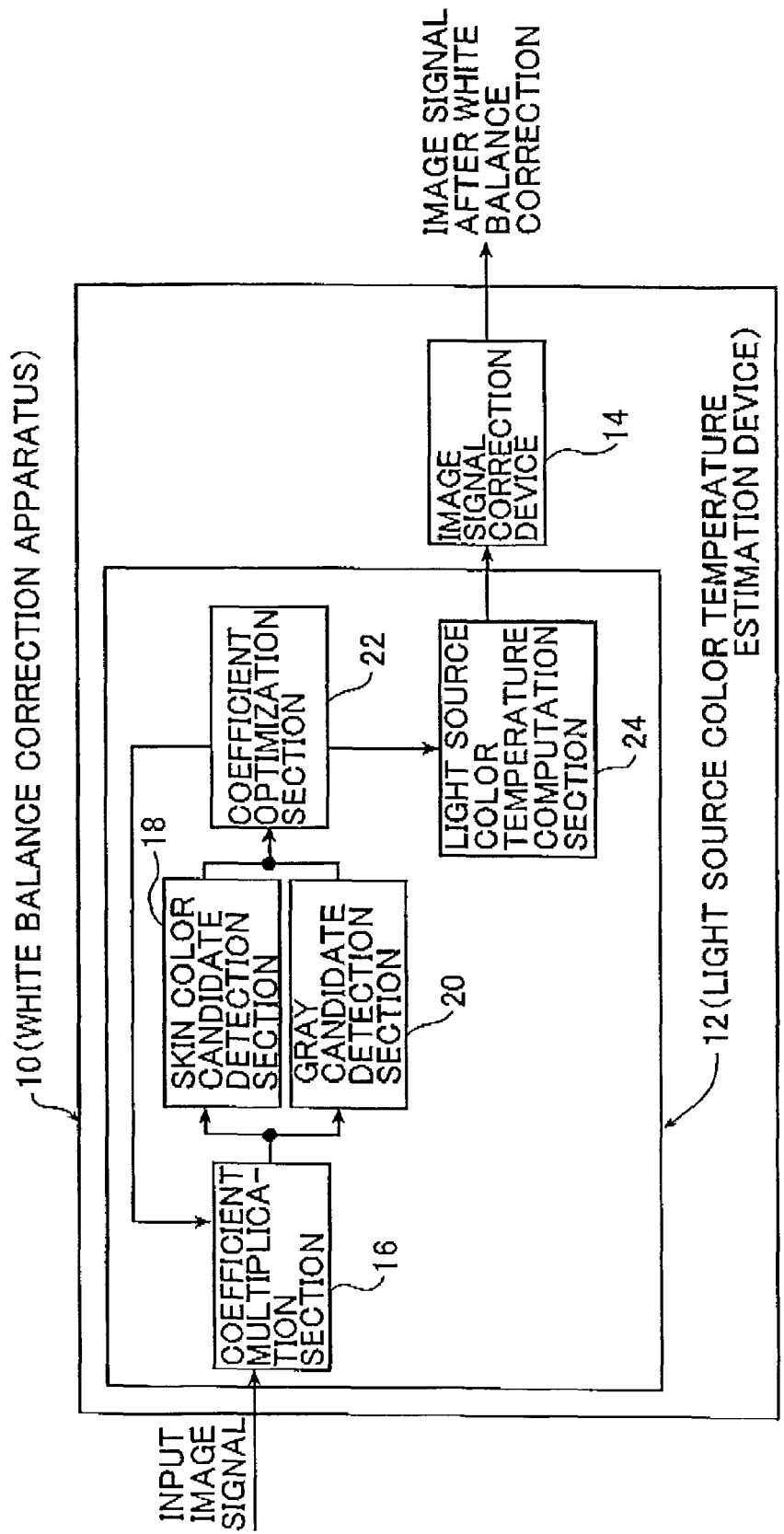
FIG. 1 is a block diagram schematically showing an embodiment of a white balance correction apparatus in accordance with the present invention.

FIG. 1 is a block diagram schematically showing an embodiment of a white balance correction apparatus of a second aspect which performs a white balance correction method of a first aspect in accordance with the present invention.

The white balance correction apparatus shown in FIG. 1 is arranged to correct white balance when digital image processing is performed on input image signal to form a photographic print. For example, it is provided in an image processor in a digital photoprinter or the like.

The white balance correction apparatus indicated by 10 in FIG. 1 is constituted mainly of a light source color temperature estimation device 12 for estimating, from an input color image, the color temperature of a light source at the time of obtaining the color image by photographing a subject, and an image signal correction device 14 for making white balance correction by using the color temperature of the photographing light source estimated by the light source color temperature estimation device 12.

The light source color temperature estimation device 12 has a coefficient multiplication section 16, a skin color candidate detection section 18, a gray candidate detection section 20, a coefficient optimization section 22, and a light source color temperature computation section 24.

Before describing the functions of these devices and sections, the principle of the present invention will first be described.

While the conventional white balance correction method corrects a color imbalance on the basis of the Evans' theorem so that the average of colors through the entire frame is gray, the present invention is characterized by positively searching for a gray portion in a frame and by correcting an imbalance by performing exposure so that the gray candidate point is finished in gray on a print.

Here, the same white balance correction method is applied to an image forming process using a color negative film and to an image forming process in a digital still camera (DSC). The principle of the present invention will be explained with respect to a case where a scene is photographed with a DSC under ordinary conditions.

A case where a scene containing a gray portion (in gray or in a color close to gray) is photographed with a DSC in natural daylight at a color temperature of 4000 K will be considered as an example.

Image signals (R, G, B) of the photographed gray portion are plotted in a chromaticity diagram by being converted into chromaticity coordinates (r, b) by the following equations (1):

$$r = R/(R+G+B)$$

$$b = B/(R+G+B) \tag{1}$$

Figure 2:
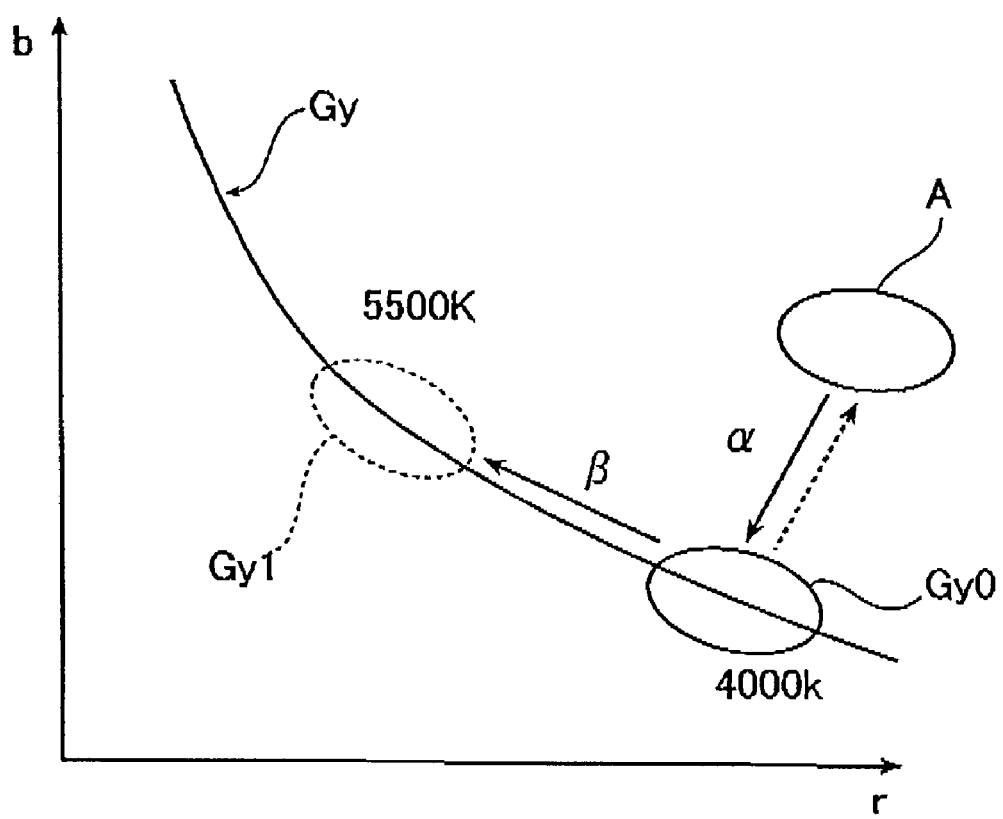
FIG. 2 is a chromaticity diagram for explaining the principle of white balance correction in the embodiment.

FIG. 2 shows the chromaticity diagram. A curve Gy in FIG. 2 is a blackbody locus of gray. As is well known, a blackbody locus is formed in such a manner that if T is color temperature; a blackbody radiation energy distribution at color temperature T is $P(\lambda)$; a spectral reflectance distribution of a subject is $\rho(\lambda)$; and a spectral sensitivity distribution of a CCD sensor is $S_i(\lambda)$ (where i=B, G, R), $E_i$ is computed by the following equation (2), $$E_i = \int P(\lambda)\rho(\lambda)S_i(\lambda)d\lambda \tag{2}$$

and this $E_i$ is plotted in a chromaticity diagram by being converted into chromaticity coordinates (r, b) by the equation (1) shown above while color temperature T is changed.

Figure 3:
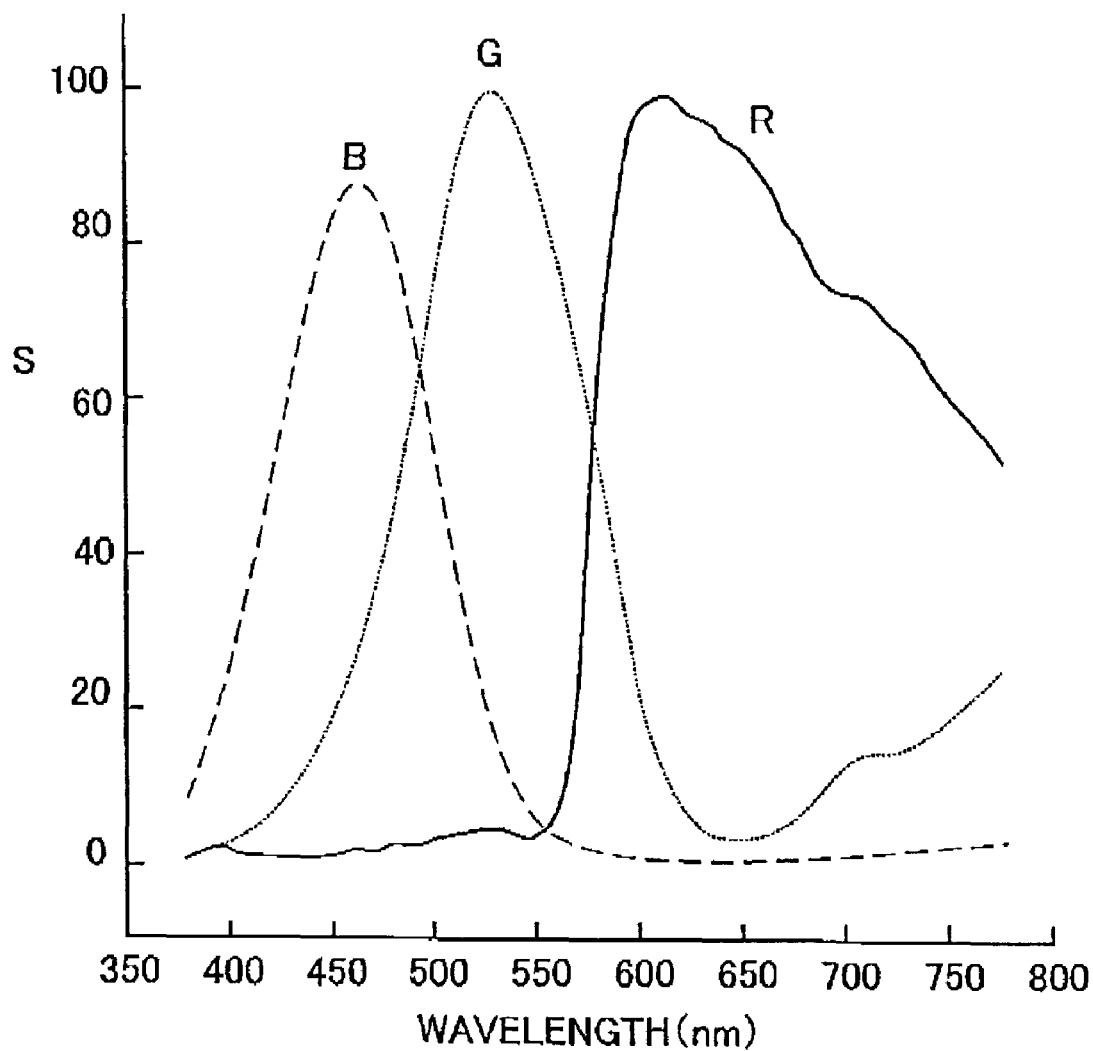
FIG. 3 is a graph showing spectral sensitivity distributions of a typical CCD sensor.
Figure 5:
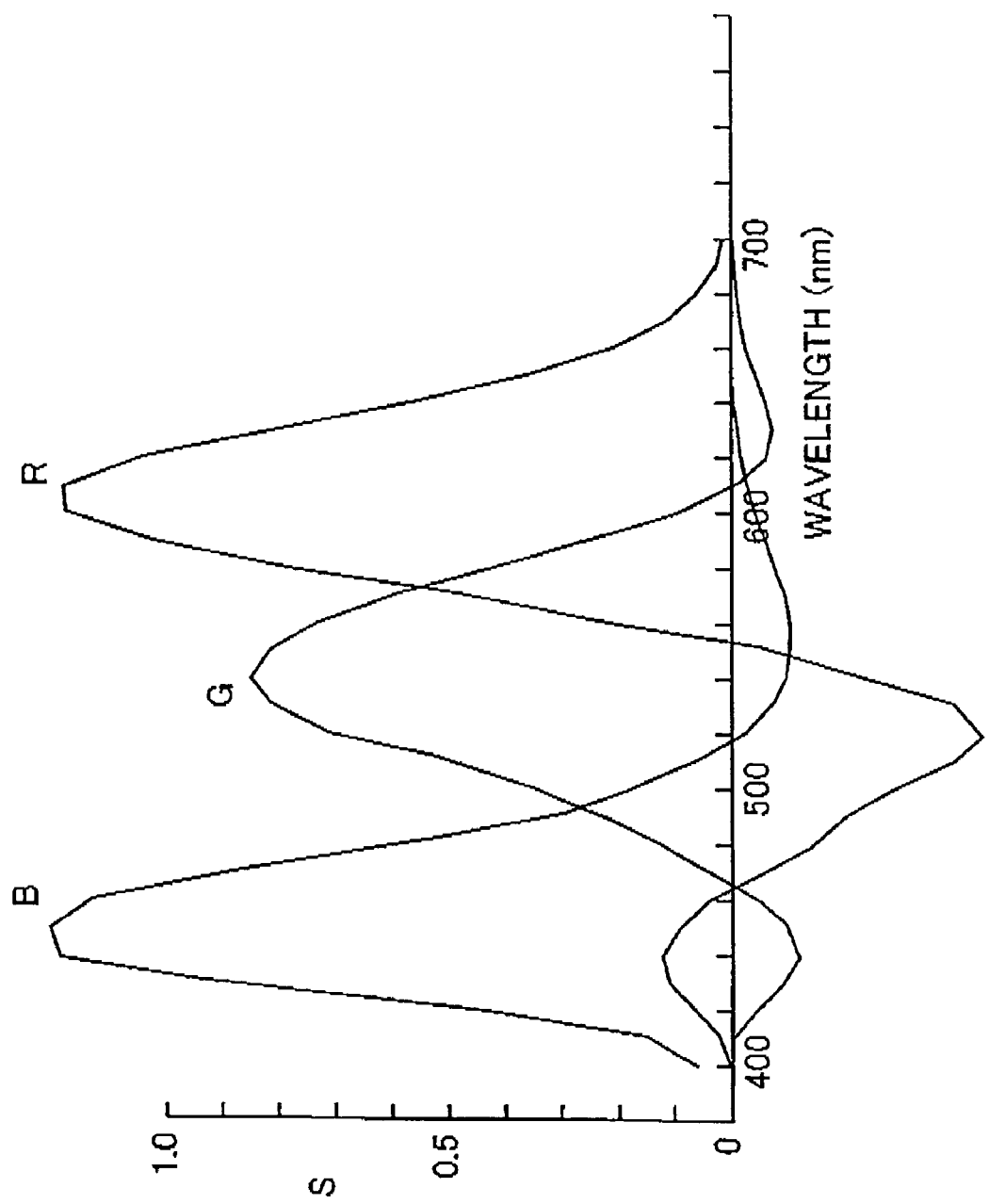
FIG. 5 is a diagram showing BT709 spectral sensitivity distributions.

A blackbody locus exists with respect to each of spectral distributions of a CCD sensor and each of the colors of a subject, and a blackbody locus of gray is obtained by setting the spectral reflectance $\rho(\lambda)$ of a subject in gray at 1. FIG. 3 shows spectral sensitivity distributions of a typical CCD sensor. It is preferable to use such $S_i(\lambda)$ characteristic of a CCD sensor. However, BT709 ideal spectral sensitivity distributions such as shown in FIG. 5 may alternatively be used.

If the above-mentioned image signal of a gray portion is plotted in the chromaticity diagram shown in FIG. 2, it is considered to be scattered in the vicinity Gy0 of the point at 4000 K on the blackbody locus of gray Gy.

In recent ordinary DSCs having an AWB (auto white balance) function, the gray portion is scattered in the vicinity Gy1 of a standard white (e.g., 5500 K) if the AWB function is suitably performed. However, if the AWB function is not suitably performed, the gray portion is scattered in a region at an unknown position remote from the photographing temperature 4000 K (e.g., a region indicated by symbol A in FIG. 2).

To convert the gray portion at such an unknown position indicated by symbol A in FIG. 2 as included in the DSC image to the vicinity Gy1 of a reference white (e.g., 5500 K), white balance correction is made in a printer. It is possible to expect that a well-gray-balanced good print will be obtained by performing this conversion with respect to each of the pixels of the image.

Since the position of the region A shown in FIG. 2 is unknown, it is impossible to make a direct conversion from the region A to the vicinity Gy1 of a reference white (e.g., 5500 K). Therefore, in the present invention, the desired conversion is performed in two steps.

That is, conversions expressed by two vectors α and β shown in FIG. 2 are made.

The vector α is a vector for correction of the amount of deviation from the blackbody locus Gy due to the imperfection of the AWB function of the DSC. The conversion using the vector a is performed as a conversion from the region A shown in FIG. 2 to the region Gy0 on the blackbody locus Gy.

The vector β is a vector for conversion from the region Gy0 to the vicinity Gy1 of the reference white (e.g., 5500 K) along the blackbody locus Gy.

The conversion from the region A to the vicinity Gy1 of the reference white (e.g., 5500 K) as shown in FIG. 2 can be achieved by combining the two vectors α and β.

The description will again be made of the devices and sections shown in FIG. 1.

It is difficult to obtain vector a expressing the conversion from the region A shown in FIG. 2 to the region Gy0 on the blackbody locus Gy in the above-described two conversion steps using vectors α and β. If the region Gy0 can be obtained, the color temperature T of the photographing light source can be estimated therefrom. Thus, it is easy to obtain the vector β expressing the conversion from Gy0 (color temperature T) to Gy1 (color temperature of 5500 K) along the blackbody locus Gy.

The light source color temperature estimation device 12 obtains the vector a to make the corresponding conversion, and the image signal correction device 14 obtains the vector β to make the corresponding conversion.

The AWB function of the DSC is performed in such a manner that the image signals R, G, and B of all the pixels, which are collected immediately after photographing, are uniformly multiplied by constants. This multiplication using constants is a linear transformation. If the image signals have deviated from the blackbody locus by this operation, the process of making the gray portion scattered mainly at temperatures in the vicinity (Gy0 in FIG. 2) of the color temperature of the photographing light source on the blackbody locus (4000 K in this case) must be the operation having the effect reverse to that of the operation performed as the AWB function.

The transformation which is the reverse of the above-described AWB function (linear transformation) of the DSC is also a linear transformation. Therefore the DSC image signals R, G and B are multiplied by predetermined coefficients (in the process shown in FIG. 2, the image signals R, G, and B are converted into chromaticity coordinates). The coefficient multiplication section 16 performs this multiplication.

The coefficient multiplication section 16 respectively multiplies R and G in the DSC image signals R, G and B by predetermined coefficients $\alpha_1$ and $\alpha_2$ as shown by the following equations (3) to convert R and G into R' and G'.

$$R' = \alpha_1 R$$

$$G' = \alpha_2 G \tag{3}$$

For conversion in the coefficient multiplication section 16, it is not necessary to change the three signals; changing two of the signals may suffice.

The region A to which the point corresponding to the original gray has been moved is unknown and it is impossible to identify the portion corresponding to the original gray. Therefore the gray candidate detection section 20 compares the signal converted by the linear transformation with the blackbody locus of gray, recognizes pixels detected in the vicinity of the blackbody locus as highly probable to correspond to the original gray, and sets the pixels as gray candidate pixels. Determination as to whether pixels are in the vicinity of the blackbody locus may be made according to whether the distance in terms of chromaticity coordinates (r, b) from the blackbody locus is within the range of 0.01.

The coefficient optimization section 22 counts the number of gray candidate pixels detected by the gray candidate detection section 20, and optimizes the coefficients $\alpha_1$ and $\alpha_2$ by making the coefficient multiplication section 16 and the gray candidate detection section 20 perform the above-described operations while changing the predetermined coefficients $\alpha_1$ and $\alpha_2$ so that the number of gray candidate pixels is maximized.

A suitable method, not particularly specified, may be used for this optimization. For example, a simplex method, which is a standard method for numerical value computation, is preferably used. The coefficients $\alpha_1$ and $\alpha_2$ in the equations (3) for linear transformation are obtained by the above-described optimization as the components of vector a corresponding to the operation reverse to the AWB function of the DSC. That is, $\alpha=(\alpha_1, \alpha_2)$.

To improve the accuracy of optimization, information on a color other than gray may also be used. Skin color can be selected from subject colors as a color appearing frequently in photographing and comparatively stable in color tint among its variations. Skin color is thought to vary considerably with respect to human races (white race, yellow-skinned race, and black race). However, it is known through spectrometric analysis that skin color varies mainly in lightness among races and does not vary largely in spectral composition, that is, skin color has only small variation in the color tint. This characteristic of skin color can be utilized for color identification.

Therefore the skin color candidate detection section 18 also sets a blackbody locus (not shown) with respect to skin color as well as that of gray, and detects skin color candidate pixels having a color close to the blackbody locus of skin color from the image signals multiplied by the coefficients in the coefficient multiplication section 16. Note that, here, as the skin color used in the computation of the blackbody locus of skin color, for example, light skin of the Macbeth chart can be used. However, the present invention is not limited to this color.

The coefficient optimization section 22 also counts the number of skin color candidate pixels detected by the skin color candidate detection section 18, combines it with the number of gray candidate pixels described above, and optimizes the coefficients $\alpha_1$ and $\alpha_2$ so that the number of these pixels is maximized, thus improving the accuracy with which the coefficients $\alpha_1$ and $\alpha_2$ are optimized. Note that, in the present invention, if primary importance is attached to the skin color, the coefficients $\alpha_1$ and $\alpha_2$ may be optimized so that the number of only the skin color candidate pixels detected by the skin color candidate detection section 18 is maximized.

It is also expected that it a scene including a gray portion and a skin color portion is photographed with a uniform light source, the average color temperatures of the group of gray candidate pixels and the group of skin color candidate pixels, detected as pixels having colors close to the blackbody locus, coincide with each other. In optimization in the coefficient optimization section 22, therefore, optimization of the above-described coefficients may be performed by setting an objective function for "minimizing the difference between the average color temperatures of the group of gray candidate pixels and the group of skin color candidate pixels".

Further, the two above-described methods may be combined to optimize the above-described coefficients by setting the objective function for "maximizing the number of at least one of gray candidate pixels and skin color candidate pixels" and the objective function for "minimizing the difference between the average color temperatures of the group of gray candidate pixels and the group of skin color candidate pixels".

The method using these two objective functions further improves the optimization accuracy.

Next, the light source color temperature computation section 24 converts the image signals by using the coefficients $\alpha_1$ and $\alpha_2$ optimized in the above-described coefficient optimization section 22, computes the average color temperature Tg of the group of gray candidate pixels on the blackbody locus of gray and/or the average color temperature Tf of the group of skin color candidate pixels on the blackbody locus of skin color, and computes the color temperature T of the photographing light source from these average color temperatures. The color temperature T may be computed by averaging as shown by T=(Tg+Tf)/2 or may be obtained as T=Tg if only gray is present or if gray is more important than skin color. It may also be obtained as T=Tf if only the skin color is present or if the skin color is more important than gray. The color temperature T of the photographing light source is thus estimated.

Further, since it can be considered that a photographing light source for photographing a subject to obtain a color image is usually one in the above-described example, the number of photographing light sources for which a color temperature is estimated is one, and an appropriate photographing source is estimated. However, if a subject is photographed indoors using a strobe (e.g., under a tungsten lamp), this precondition may not be realized.

That is, one of the points that should be taken into account here is handling of an image photographed with strobe light, in particular, an image photographed indoors with strobe light, for example, under presence of other light sources such as a tungsten light source. In this case, two light sources with completely different color temperatures coexist. That is, light in a part illuminated by the strobe light (e.g., a person in the center of a frame image) has a color temperature in the order of 5000 K, which is a color temperature of strobe light, and light in a part not illuminated by the strobe light at the rim of the image photographed with strobe light (illuminated by the light of the tungsten lamp) has a color temperature in the order of 3000 K, which is a color temperature of light of a tungsten lamp.

As a result, a color temperature of a photographing light source in the case in which the number of photographing light sources is estimated to be one as in the above-described example becomes an average of both the color temperatures, for example, 4000 K, and is estimated to be lower than 5000 K of the color temperature of the strobe that is a main photographing light source. Thus, the skin color of the person, who is the subject, is tinged blue. Consequently, consideration for this problem is required.

Therefore, in another embodiment of the present invention, ingenuity is put into the method of computing a color temperature of a light source in order to improve white balance correction of an image photographed with strobe light involving such light sources of different types.

In this embodiment, the light source color temperature computation section 24 converts an image signal using the optimized coefficients $\alpha_1$ and $\alpha_2$ to compute an average color temperature Tg of a group of gray candidate pixels on a blackbody locus of gray and an average color temperature Tf of a group of skin color candidate pixels on a blackbody locus of skin color as in the above-described example. In this case, the light source color temperature computation section 24 in accordance with this embodiment divides the above-mentioned group of gray candidate pixels and group of skin color candidate pixels into two subgroups corresponding to different light sources (a tungsten light source and a strobe light source in this context), respectively, (two subgroups of gray candidate pixels and two subgroups of gray candidate pixels). The light source color temperature computation section 24 then converts, for example, the number of candidate pixels belonging to each subgroup into a histogram and determines that the subgroup with the larger number of the candidate pixels is a principal (main) light source. That is, when the group of gray candidate pixels and the group of skin color candidate pixels are converted into a histogram, respectively, a plurality of peaks (two peaks in the above-described example) appear. Thus, the light source color temperature computation section 24 divides the groups having each peak into subgroups, respectively, and determines that the subgroup with the higher peak, that is, the subgroup with the larger number of candidate pixels is the principal light source.

Then, the light source color temperature computation section 24 finds average temperatures (Tf, Tg) of each subgroup that is determined as the principal light source and computes a color temperature T of a photographing light source. In this computation of the color temperature T of the photographing light source, for example, it is sufficient to consider that T=Tf if only the skin color is present or if the skin color is more important than gray and consider that T=Tg if only gray is present or if gray is more important than the skin color.

In this way, the color temperature T of the photographing light source is estimated.

Finally, the image signal correction device 14 makes a conversion from the thus estimated color temperature T to the reference white (e.g., 5500 K) along the blackbody locus. This conversion can be expressed as linear transformation of the R and B signals shown by the following equations:

$$R''=\beta_1 R'$$

$$B''=\beta_2 B \quad (4)$$

These coefficients $\beta_1$ and $\beta_2$ are obtained as the components of vector $\beta$.

The image signal correction device 14 performs conversion using this vector $\beta$ on each pixel to complete white balance correction with respect to each pixel.

The above-described conversion process is summarized below. The conversion from the point A to the reference white (e g., 5500 K) Gy1 as shown in FIG. 2 is realized as a resultant of transformation by vector $\alpha$ and transformation by vector $\beta$, as shown by the following equations (5):

$$R''=\alpha_1\beta_1 R$$

$$G''=\alpha_2 G$$

$$B''=\beta_2 B \quad (5)$$

The equations (5) include a change in lightness as well as a color balance. These equations may be rewritten as shown below by assuming that the G signal is constant.

$$R''=(\alpha_1\beta_1/\alpha_2)R$$

$$G''=G$$

$$B''=(\beta_2/\alpha_2)B \quad (6)$$

Figure 4:
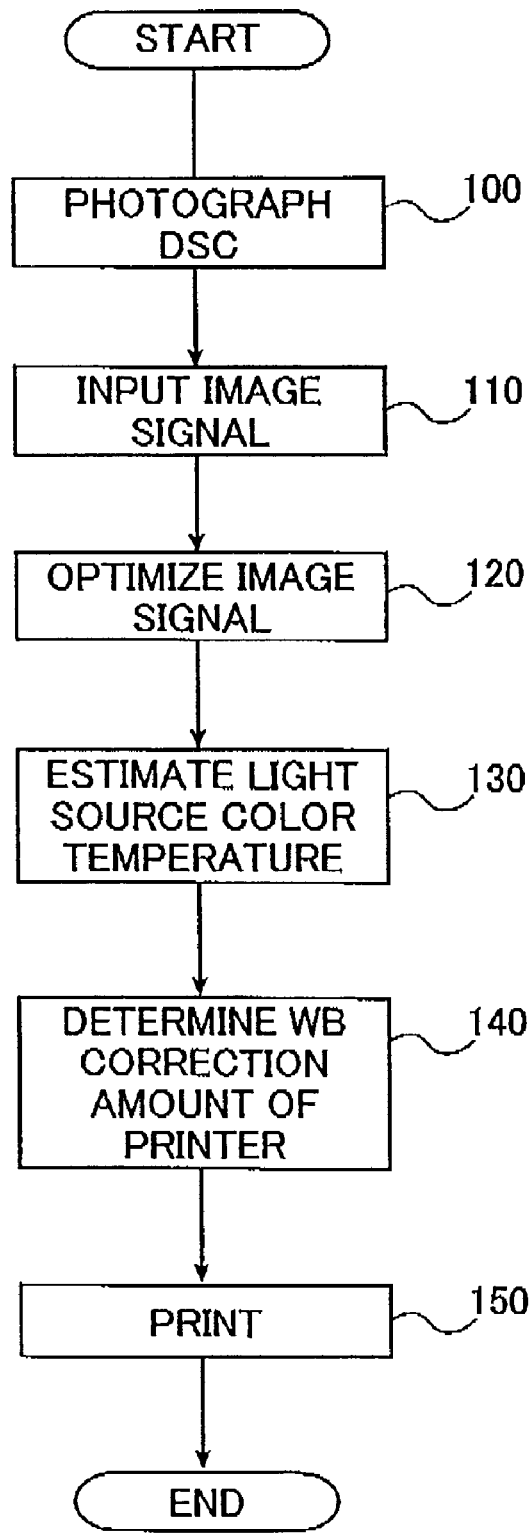
FIG. 4 is a flowchart showing a flow of processing in the embodiment.

The operation of this embodiment will be described with reference to the flowchart of FIG. 4.

First, in step 100, a scene is photographed in light from a certain light source by using a digital still camera (DSC).

In step 110, the image signals R, G, and B of the image formed by the DSC are input.

In step 120, image signal optimization processing is performed by the coefficient multiplication section 16, the skin color candidate detection section 18, the gray candidate detection section 20 and the coefficient optimization section 22 of the light source color temperature estimation device 12. This processing is intended to restore the image signals, which are caused to deviate from a blackbody locus by the AWB function of the DSC, to signals (raw data) without a deviation in the vicinity of the blackbody locus. The coefficient multiplication section 16 multiplies all the image signals by predetermined coefficients. The skin color candidate detection section 18 compares this data with the blackbody locus of skin color to detect data (skin color candidate pixels) considered to have a color in the vicinity of the skin color on the blackbody locus. The gray candidate detection section 20 compares this data with the blackbody locus of gray to detect data (gray candidate pixels) considered to have a color in the vicinity of the gray on the blackbody locus.

The coefficient optimization section 22 counts the detected skin color candidate pixels and/or the detected gray candidate pixels, and optimizes the above-described coefficients by resetting the coefficients and repeating setting the coefficients so that the number of the skin color candidate pixels and/or gray candidate pixels is maximized or the difference between the average color temperature of the group of skin color candidate pixels and the average color temperature of the group of gray candidate pixels is minimized, or both of these conditions are satisfied.

In step 130, the light source color temperature computation section 24 computes the estimated value T of the color temperature of the photographing light source from the average color temperature Tf of the group of skin color candidate pixels and the average color temperature Tg of the group of gray candidate pixels, obtained by multiplication by the optimized coefficients. Note that, if illumination is considered to be formed of a plurality of light sources, for example, two light sources, it is preferable to compute an estimated value T of a color temperature of the light sources taking into account a result of sub-grouping described above.

Next, in step 140, the image signal correction device 14 determines the amount of correction from the light source color temperature T estimated in the light source color temperature computation section 24 to the reference white (e.g., 5500 K), and corrects the white balance of all the pixels by this amount of correction.

Finally, in step 150, other kinds of image processing are performed on the image signals, and a finished print is output from the printer.

As described above, according to the photoprinter incorporating the white balance correction apparatus in accordance with the present invention, an effect of improvement in a white balance correction capability on a finished print is recognized compared with the case of printing by the conventional technique.

Here, a supplementary explanation will be given on step 130 of FIG. 4 in the case in which two-light source illumination is used.

A group of gray candidate pixels and a group of skin color candidate pixels that are detected as near colors of a blackbody locus curve are distributed dispersing (separating) in two parts near a color temperature of an incandescent lamp (3000 K) and near a color temperature of strobe light (5000 K to 5500 K). In this embodiment, these pixel groups are not simply averaged for the color temperatures but a histogram (cumulative frequency distribution) is created with respect to the color temperatures.

Then, for skin color, the group of skin color candidate pixels are divided into a first subgroup of skin color candidate pixels and a second subgroup of skin color candidate pixels with an inflection point of a skin color cumulative frequency distribution as a boundary to find an average color temperature of each subgroup. Then, a higher average color temperature is regarded as an average color temperature of the entire group of skin color candidate pixels. For gray, in the same manner, the group of gray candidate pixels are divided into a first subgroup of gray candidate pixels and a second subgroup of gray candidate pixels with an inflection point of a gray cumulative frequency distribution as a boundary to find an average color temperature of each subgroup. Then, a higher average color temperature is regarded as an average color temperature of the entire group of gray candidate pixels. A color temperature of the photographing light source is estimated according to an average value of the average color temperature of the group of skin color candidate pixels and the average color temperature of the group of gray candidate pixels.

Note that if the inflection point of the cumulative frequency distribution cannot be found, it is sufficient to regard that single-light source illumination is used and estimate a color temperature by the method in the case of using the above-described single-light source illumination.

Further, in the present invention, for example, when image signals of respective pixels in an input color image are multiplied by set coefficients in the coefficient multiplication section 16 and, as a result, when the coefficient is optimized in the coefficient optimization section 22 so that the above-described predetermined objective function is minimized, it is preferable to detect a maximum value of the image signal of the input image and divide each image signal of the input image by this maximum value, thereby using an image signal that is standardized so that the maximum value of the image signal becomes 1.0. In this way, the present invention can be applied to an image even if it is photographed in a state of considerable lack of exposure and/or excessive exposure (underexposure/overexposure).

The present invention will be further described with respect to concrete examples thereof.

EXAMPLE 1

The performance of the above-described white balance correction method was tested when prints were formed from 309 frames of DSC images obtained by picture-taking with typical two DSC models from Fuji Photo Film Co., Ltd. For comparison with the prints formed in accordance with the present invention, original images (prints which were output without correction after AWB in the DSCs) and prints which were obtained by performing on the images from the DSCs white balance correction based on the conventional art were prepared. The prints evaluated were sorted into 3 groups; good ones (X), unsatisfactory ones (Y), and defective ones (Z). Only the good ones (X) were counted as passed items.

First, 8-bit DSC image signals R, G, and B were converted into subject-linear signals $R_0$, $G_0$, and $B_0$, as described below.

8-bit DSC image signals R, G, and B obtained by picture-taking with the DSC are processed as described below. First, subject-linear signals $R_o$, $G_o$, and $B_o$ generated from the CCD sensor are converted by gamma-0.45 nonlinear transformation shown by the following equations (7):

$$R_1 = 1.099 \times R_o^{0.45} - 0.099$$

$$G_1 = 1.099 \times G_o^{0.45} - 0.099$$

$$B_1 = 1.099 \times B_o^{0.45} - 0.099 \tag{7}$$

Thereafter, color difference signals $Y_1$, $C_{r1}$ and $C_{b1}$ are formed therefrom as shown by the following equations (8):

$$Y_1 = 0.30 R_1 + 0.59 G_1 + 0.11 B_1$$

$$C_{r1} = 0.70 R_1 - 0.59 G_1 - 0.11 B_1$$

$$C_{b1} = -0.30 R_1 - 0.59 G_1 + 0.89 B_1 \tag{8}$$

A color-difference matrix operation is performed on these signals to improve the chromaticity, thereby making conversions into color-difference signals $Y_2$, $C_{r2}$, and $C_{b2}$ shown by the following equations (9):

$$Y_2 = Y_1$$

$$C_{r2} = 1.625 C_{r1} = 0.2734 C_{b1}$$

$$C_{b2} = -0.08203 C_{r1} + 1.6094 C_{b1} \tag{9}$$

Finally, R, G and B signals are restored and converted into 8-bit signals by the following equations (10) to obtain 8-bit DSC image signals R, G, and B.

$$R = Y_2 + C_{r2}$$

$$G = Y_2 - 0.51 C_{r2} - 0.18 C_{b2}$$

$$B = Y_2 + C_{b2} \tag{10}$$

To convert 8-bit DSC image signals R, G, and B into subject-linear signals $R_0$, $G_0$, and $B_0$, therefore, the inverse operation process starting from processing R, G, and B signals and the operations in the order from equations (10), equations (9), equations (8), and equations (7) may be performed. This inverse operation process was performed to obtain the subject-linear signals $R_0$, $G_0$, and $B_0$.

Next, the amounts of white balance correction based on optimization of subject-linear signals $R_0$, $G_0$, and $B_0$ were computed.

To enable this computation, the blackbody locus of gray and the blackbody locus of skin color were formed in advance by using the spectral sensitivity of the DSC used for picture-taking. Operations for optimizing the $R_o$, $G_o$, and $B_o$ signals were performed by using these loci to obtain vector $\alpha$ and vector $\beta$, and white balance correction signals R", G", and B" were obtained as shown by equations (11) below. This optimization computation was performed by optimizing the coefficients so that the number of gray candidate pixels and skin color candidate pixels was maximized and the difference between the average color temperature of the group of skin color candidate pixels and the average color temperature of the group of gray candidate pixels was minimized.

$$R'' = (\alpha_1 \beta_1 / \alpha_2) R_0$$

$$G'' = G_0$$

$$B'' = (\beta_2 / \alpha_2) B_0 \tag{11}$$

To convert these white balance correction signals R", G", and B" into 8-bit image signals, the operations may successively be performed in the order of equations (7), equations (8), equations (9), and equations (10). These signals were output from the printer to obtain a white-balance-corrected print.

Table 1 shows the results of comparison between the prints after white balance correction in accordance with the present invention, the original images and those obtained by the conventional art.

TABLE 1

|  | Original Images | Conventional art | Present Invention |
| --- | --- | --- | --- |
| Passing Rate (%) | 65.3 | 78.3 | 90.0 |

As shown in Table 1, the passing rate of the present invention was higher by about 12 points than that of the conventional art, and the high white balance correction performance of the present invention was confirmed.

EXAMPLE 2

In Example 1, the names of DSCs were known and the spectral sensitivity and the color processing algorithm were also known. However, if the white balance correction method of the present invention is used as printing software, it is desirable to ensure applicability to correction of DSC images formed by unknown models (or to ensure robustness).

In Example 2, a white balance correction test was made with respect to 309 frames of DSC images obtained by picture-taking with typical two DSC models from Fuji Photo Film Co., Ltd, which are same as those used in Example 1, and 240 frames of images obtained by picture-taking of the same scenes (16 frames) with fifteen unidentified models from other manufactures.

In this example, white balance correction in accordance with the present invention was performed under the assumption that all models were DSCs having ideal spectral sensitivities, because, even if the model cannot be identified, the performance of any model can be approximated to the ideal spectral sensitivity characteristics of BT709 as shown in FIG. 5 by virtue of the combination of the spectral sensitivity and the color processing algorithm.

That is, in this example, the spectral sensitivity distributions of BT709 shown in FIG. 5 were used as spectral sensitivity distribution $S_i$ (i=R, G, B) of the CCD sensor in equation (2) for obtaining a blackbody locus.

In this example, since DSCs having the ideal spectral sensitivities do not need the color processing algorithm for improving the chromaticity, it is not necessary to perform, for conversion of 8-bit DSC image signals R, G, and B into subject-linear signals $R_o$, $G_o$, and $B_o$, the inverse operation process from equations (10) to equations (7) required in Example 1, and the inverse operation of equations (7) can be immediately performed.

The blackbody locus of gray and the blackbody locus of skin color were formed in advance by using the ideal spectral sensitivity of BT709, the operations for optimizing $R_o$, $G_o$, and $B_o$ signals were performed by using these loci to obtain vector α and vector β, as in Example 1. White balance correction signals R", G", and B" expressed by equations (11) were obtained therefrom.

These signals were converted by gamma-0.45 nonlinear conversion and converted signals were 8-bit quantized to obtain 8-bit image signals, which were supplied to a printer to obtain a white-balance-corrected print.

The prints thus obtained were evaluated, as were those in Example 1. The prints evaluated were sorted into good ones (X), unsatisfactory ones (Y), and defective ones (Z). Only the good ones were counted as passed items. Table 2 shows the evaluation results.

TABLE 2

| | Typical models from Fuji Photo Film Co., Ltd. (309 frames) | 16 scenes (240 frames) by 15 models from other manufacturers | | |
| --- | --- | --- | --- | --- |
| | Present Invention | Original images | Conventional art | Present invention |
| Passing rate (%) | 88.0 | 47.1 | 70.0 | 76.2 |

As shown in Table 2, substantially the same passing rate (88%) as that in Example 1, though slightly lower, was maintained with respect to the two typical models from Fuji Photo Film Co., Ltd. (309 frames). With respect to the fifteen models from the other manufacturers (240 frames), it is observed that the absolute value of the passing rate achieved by the present invention was low (76%) than that achieved by the two typical models from Fuji Photo Film Co., Ltd. but higher by about 6 points than that achieved by the conventional art.

The reason for the low passing rate may be because, as can be understood from the considerably low passing rate (47%) of the original images, the number of evaluated scenes was small (16 scenes) and the images had imbalance details, and also because the actual DSCs were assumed to be DSCs having ideal spectral sensitivities.

As described above, according to Example 2, the white balance correction method of the present invention is sufficiently effective when provided as common software and achieves a sufficiently high white balance correction effect even with respect to image forming apparatus models whose spectral sensitivity and color processing algorithm are unknown.

Further, in the above-mentioned examples, in the optimization computation, a white balance correction signal is found by optimizing coefficients so that the number of gray candidate pixels Ng and the number of skin color candidate pixels Nf are maximized and the difference between the average color temperature Tg of the group of gray candidate pixels and the average color temperature Tf of the group of skin color candidate pixels is minimized. In this case, there is one objective function F for optimization, which is represented by the following equation:

$$F=abs(Tg-Tf)-(Ng+Nf)$$

Here, abs indicates an absolute value. Since the simplex method works so that a set objective function is minimized, if maximization of the number of candidate pixels is desired, it is sufficient to make (Ng+Nf) subtracted as shown above.

Even if there is only one objective function, a favorable result was obtained as a whole as described above. However, looking at the prints in detail, defective prints (prints of the evaluation Z (defective ones)) were found here and there. Since it was important to reduce the number of prints of the evaluation Z (defective ones) as much as possible in the automatic printing work, an effect in the case of an increased number of objective functions was investigated. The number of objective functions was increased to two. The following equation was used as a second objective function:

$$F^*=abs(Tg-Tf)-Ng$$

A first white balance correction signal obtained by optimizing coefficients using the first objective function and a second white balance correction signal obtained by optimizing coefficients using the second objective function were averaged to obtain a new white balance correction signal to form prints. Then, approximately a half of the prints that were given the evaluation Z (defective ones) changed to prints of the evaluation Y (unsatisfactory ones). The number of prints of the evaluation X (good ones) hardly changed, and as a whole, the number of prints of the evaluation Y (unsatisfactory ones) increased and the number of prints of the evaluation Z (defective ones) decreased. As a result, stable prints were obtained. Moreover, the combination of two objective functions is not limited to this. When other combinations were checked, a combination of the following two objective functions were most effective for stabilization of prints:

$$F=abs(Tg-Tf)-Ng$$

$$F^*=abs(Tg-Tf)-Nf$$

A white balance correction method of the embodiment in this case will be described with reference to FIG. 6.

Figure 6:
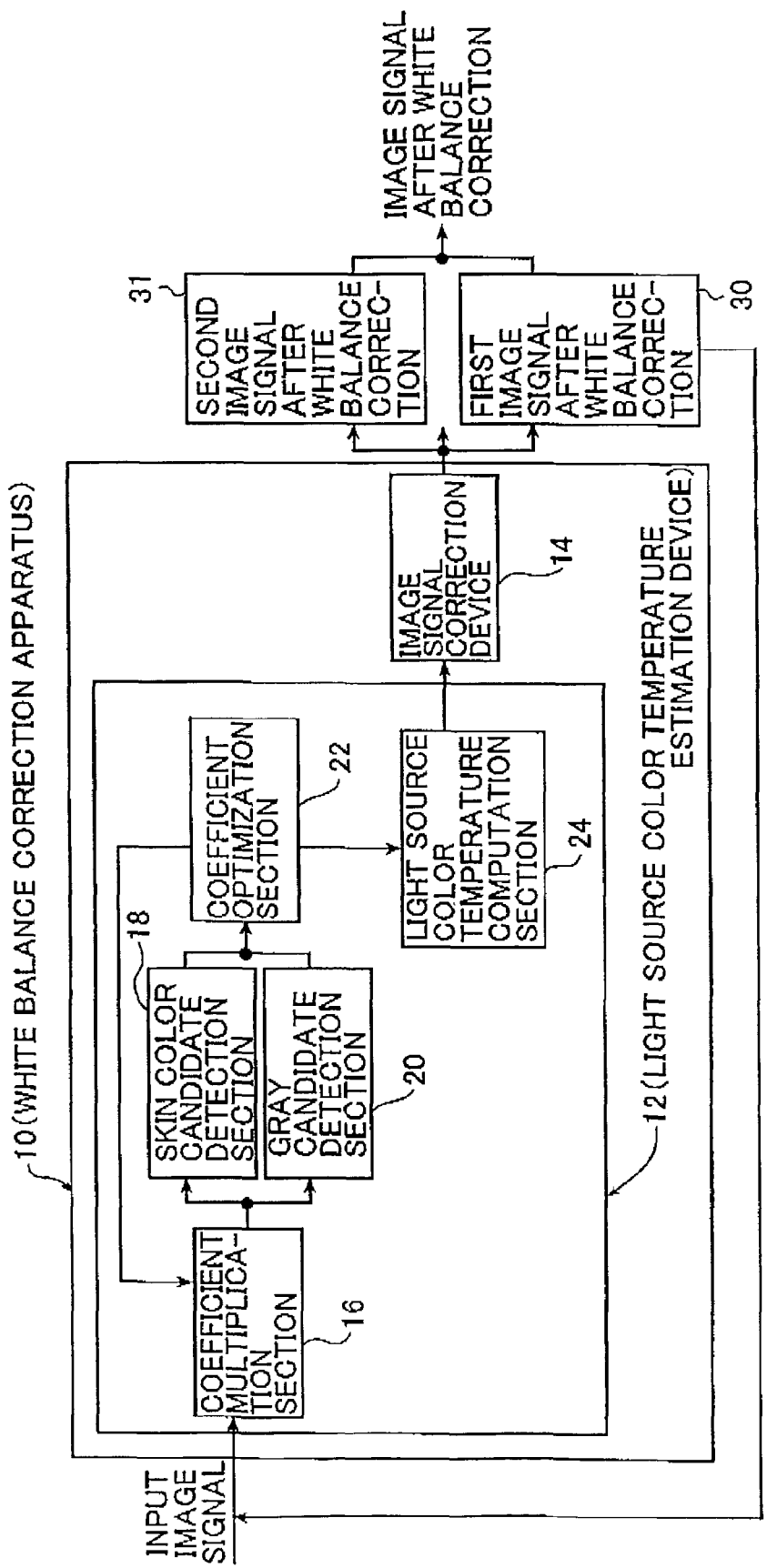
FIG. 6 is a block diagram schematically showing another embodiment of a white balance correction apparatus in accordance with the present invention.

As shown in FIG. 6, a first image signal after white balance correction corresponding to the first objective function, which is outputted from a white balance correction apparatus 10, is saved in a memory 30. Subsequently, a second image signal after white balance correction corresponding to the second objective function is saved in a memory 31. Thereafter, a new image signal after white balance correction is generated from the first and second image signals after white balance correction and used as a signal for forming prints.

Moreover, as a method of stabilizing print outputs, it was also found to be effective to form prints with weakened correction rather than directly using an image signal after gray balance correction obtained by an optimization computation. A degree of weakening is preferably 60 to 80%. In addition, correction may be weakened to 60 to 80% according to a BV value (index indicating brightness of an image) written in an Exif file of a DSC image.

In addition, in the optimization computation described above, a pixel with a small signal value (dark pixel) was considered to have little effective information in the past. Thus, for saving a computation time, a pixel with a signal value equal to or less than a lower limit value (0.08) was not used in the computation. However, in an underexposed image, since signal values of many pixels become lower than the lower limit value of 0.08, the number of pixels that can be used in the optimization computation considerably decreases and computation accuracy falls. To the contrary, in an overexposed image, for example, in the case in which a white wall is illuminated by a tungsten lamp and exposure is appropriate, all signal values of R=1.0, G=0.7, B=0.5 of a signal are clipped to 1.0 such as R=1.0, G=1.0, B=1.0, and the signal turns into a signal just like that of reference light source illumination. However, in the case in which a signal value is 1.0, it is difficult to determine whether it is a real value or a value caused by clipping. Therefore, it is necessary to examine pixels to be used for the optimization computation depending on underexposure or overexposure. For example, it is possible to lower a lower limit value and increase the number of pixels. But it is bothersome to change a set value for each image. Thus, in order to automatically examine pixels, an image signal is standardized so that its maximum value becomes 1.0 to allow the number of pixels that can be used in the optimization computation to be maintained substantially constant regardless of underexposure or overexposure as described below.

That is, pixels in which at least one of R, C, and B signals is 1.0 are excluded, and maximum values ($R_{max}$, $G_{max}$ and $B_{max}$) are found for R, G and B signals, respectively, for all the remaining pixels. A maximum value and a minimum value among the maximum values are assumed to be $T_{max}$ and $T_{min}$, and R, G and B signals of an image are standardized by $T_{max}$. Consequently, an image just like an image photographed by appropriate exposure is obtained. A range of signal use is limited to a bright range of 1.0 to 0.25× ($T_{min}/T_{max}$), whereby appropriate white balance correction can be realized for any images of appropriate underexposure and overexposure without using so many pixels in the optimization computation. In a scene of snow under overexposure, whiteness of the snow was successfully detected and beautiful finish prints could be realized by an effect of the standardization processing.

In the present embodiment of the present invention, as described above in detail, an algorithm using only gray and/or skin color information in a DSC image is constructed to correct white balance at the time of printing, and the apparatus and method of the present invention are advantageously effective in correcting white balance in comparison with the conventional art, as can also be understood from the examples. The effect of determining whether a color tint of the whole of an image is due to the photographing light source or the subject in accordance with the present invention, is advantageously improved in comparison with the conventional art having an imperfection with respect to this effect. In particular, the correction performance of the present invention is substantially perfect with respect to a high color temperature of a shaded scene or a scene under cloudy weather (7000 to 10,000 K), so that while an entirely bluish print in which a human face has color subsidence is formed in such a situation by the conventional art, a print in which revived white is exhibited and in which skin color is natural can be obtained according to the present invention.

In addition, as described above, all signals of an image are standardized so that a signal value of a brightest pixel in the image becomes 1.0, whereby it becomes possible to perform the optimization computation and process the image regardless of underexposure or overexposure. Consequently, an image of the same quality as an image photographed by appropriate exposure can be obtained.

Next, the method for correcting density as a second embodiment of the present invention is described with reference to the flowchart of FIG. 7. If the type of a light source is unknown, according to this method, skin color (not limited specifically to that of a face) in an image is detected utilizing the method for detecting skin color candidate pixels as stated above in the description of the first embodiment of the invention, and then the print density is determined based on the information about the color to form a proper print.

Apparatus for effecting the second embodiment of the invention are exemplified by a digital photoprinter comprising an image processor provided with the coefficient multiplication section 16, the skin color candidate detection section 18 and the coefficient optimization section 22 in the white balance correction apparatus 10 as stated above in the description of the first embodiment of the invention (as well as a density correction section).

First in step 200, a scene is photographed in light from a certain light source by using a digital still camera (DSC) and then, in step 210, the image signals R, G and B of the formed image are input. In step 220, the input signals are subjected to the skin color candidate detection processing as stated above in the description of the first embodiment of the invention, so that skin color candidate pixels are detected. In particular, all the input image signals are multiplied by predetermined coefficients and the data thus obtained are compared with the blackbody locus of skin color to detect data, which are considered to be in the vicinity of the skin color on the blackbody locus, as skin color candidate pixels. At this time, the number of the detected skin color candidate pixels may additionally be counted and the coefficients for the multiplication as above may be optimized so that the above number is maximized, or so that the difference between the average color temperature of a group of detected skin color candidate pixels and the average color temperature of a group of gray candidate pixels obtained in a similar way to the skin color candidate pixels is minimized, or so that these two conditions are both satisfied, to perform the multiplication using the coefficients thus optimized and obtain skin color candidate pixels.

In the next step 230, density correction is performed. In particular, the average of the color signals (R, G and B) of the skin color candidate pixels detected as stated above is initially determined. For this purpose, it may be available the average of the color signals R, G and B((R+G+B)/3), or any specific color signal, G signal, for example. The signal to be used is not particularly limited, although it is preferable to use G signal.

In the case of using G signal, density correction is performed by assigning the average obtained for G signal to, a predetermined G density D (D=0.7, for example) on a print. The G density D is preferably between 0.7 and 1.0 both inclusive.

In step 240, the data obtained at the end of density correction are output by the printer.

In this way, even if the type of a photographing light source is unknown, the density of a human face as a principal subject will be made proper by detecting skin color and performing density correction based on the information about the color. In consequence, a print can be properly finished.

As an example, density correction was performed with respect to an image formed by photographing with a DSC a backlighted scene (a scene where a person in the center is backlighted), which often fails to be properly photographed with a DSC under density correction by LATD method, and following results were obtained.

The print formed under density correction by LATD method was evidently not appropriate, because, although the density through the print was satisfactory, the face of the person looked pitch-dark.

In contrast, in the case of the print which was formed under density correction utilizing the detection of skin color according to the second embodiment of the invention, assuming that the type of a light source is unknown, the face of the person had a proper density, even though the background density was rather lower, the print being substantially satisfactory. This effected by virtue of the fact that skin color was successfully detected and printing was performed under density correction based on such a detection of skin color. Proper print densities could also he achieved with respect to other scenes than what is referred to above.

As described above in detail, according to the above-mentioned each embodiment, since an algorithm using only gray and/or skin color information in a DSC image is established to perform white balance correction at the time of forming prints, a remarkably better correction capability can be obtained compared with the conventional technique.

Further, although a DSC image is described in the above-mentioned embodiment, the white balance correction method of the present invention can be applied not only to a DSC image but also to an image photographed on a color negative film.

If one or both of the white balance correction method and the density correction method as described hereinabove are recorded as a computer-executable program on a computer-readable recording medium, the white balance correction method or the density correction method of the present invention may be carried out in a suitable apparatus such as an image processor by loading the program from the recording medium into the apparatus employed.

The apparatus for correcting white balance, the method for correcting white balance and the method for correcting density, as well as the recording medium on which a program for carrying out these methods is recorded, all of which the present invention provides, have been described in detail with various embodiments and examples. Needless to say, the present invention is not limited to the described embodiments and examples, and various modifications and changes of the described embodiments and examples can be made without departing from the scope of the invention.

For example, in the above-mentioned embodiments, in the optimization computation, coefficients are optimized so that the number of gray candidate pixels Ng and the number of skin color candidate pixels Nf are maximized and the difference between the average color temperature Tg of the group of gray candidate pixels and the average color temperature Tf of the group of skin color candidate pixels is minimized. However, it is possible to change this to another objective function.

In addition, as described above, it is possible to merchandise the present invention as a program for making a computer execute the above-mentioned white balance correction method and/or density correction method and a recording medium having this program computer-readably recorded thereon. Moreover, it is also possible to commercialize the present invention as a white balance correction apparatus and/or a density correction apparatus that implements the above-mentioned white balance correction method and/or density correction method.

According to each aspects of the present invention, as described above, an algorithm is constructed to correct white balance by estimating the color temperature of the photographing light source used in photographing a color image only from gray and/or skin color information contained in the input color image, which enables suitable white balance correction at a high hit rate with respect to any input images regardless of DSC models used for forming images, or even in a case of photographing indoors with strobe light.

In particular, according to the present invention, in the case in which an entire image is standardized using a brightest pixel in the image, the optimization computation can be performed to process the image regardless of underexposure or overexposure, and an image of appropriate exposure can be obtained.

Moreover, according to the present invention, by detecting skin color in an image and performing density correction based on the information about the color, the print density can be made proper even with respect to those images of scenes where it is difficult with prior arts to make the print density proper.

What is claimed is:

1. A white balance correction method, comprising the steps of:
    estimating, by using at least gray and/or skin color information contained in an input color image, a color temperature of a photographing light source with which the color image has been taken; and
    correcting image signals of the color image based on the estimated color temperature,
    wherein said estimating step includes:
    multiplying the image signals of respective pixels in the input color image by set coefficients;

setting pixels having the multiplied image signals in the vicinity of blackbody locus curve of skin color as skin color candidate pixels and pixels having the multiplied image signals in the vicinity of a blackbody locus curve of gray as gray candidate pixels;

optimizing the set coefficients so that the number of the skin color candidate pixels and/or gray candidate pixels is maximized and a difference between an average color temperature of the group of skin color candidate pixels and the group of gray candidate pixels is minimized;

obtaining a group of skin color candidate pixels and a group of gray candidate pixels by using the optimized coefficients;

dividing the group of skin color candidate pixels into a plurality of subgroups of skin color candidate pixels and dividing the group of gray candidate pixels into a plurality of subgroups of gray candidate pixels; and estimating a color temperature of the photographing light source from an average color temperature of a subgroup of skin color candidate pixels with a high average color temperature among the plurality of subgroups of skin color candidate pixels and an average color temperature of a subgroup of gray candidate pixels with a high average color temperature among the plurality of subgroups of gray candidate pixels, and wherein the color image signals multiplied by the optimized coefficients are corrected by a difference between the estimated color temperature and a color temperature of reference white.

2. The white balance correction method according to claim 1, wherein only said gray and skin color information is used when correcting the image signals of the color image.

3. The white balance correction method according to claim 1 wherein, when each of the blackbody locus curve of skin color and the blackbody locus curve of gray is set, a spectral sensitivity of a photographing apparatus used to form the input color image is used as a spectral sensitivity distribution.

4. The white balance correction method according to claim 1, wherein, when each of the blackbody locus curve of skin color and the blackbody locus curve of gray is set, a spectral sensitivity of BT709 is used as a spectral sensitivity distribution.

5. The white balance correction method according to claim 1, wherein the image signals are corrected by using both a first white balance correction signal and a second white balance correction signal, the first white balance correction signal being adapted for correcting the color image signals by a difference between a first estimated color temperature and a color temperature of reference white, and the second white balance correction signal being adapted for correcting the color image signals by a difference between a second estimated color temperature and a color temperature of reference white.

6. The white balance correction method according to claim 1, wherein a maximum value of the image signal is detected, and an image signal is used which is standardized so that the maximum value of the image signal becomes 1.0 by dividing each image signal by the maximum value of the image signal.

7. A white balance correction method, comprising the steps of:

estimating, by using at least gray and/or skin color information contained in an input color image, a color temperature of a photographing light source with which the color image has been taken; and correcting image signals of the color image based on the estimated color temperature, wherein said estimating step includes:

multiplying the image signals of respective pixels in the input color image by set coefficients;

setting pixels having the multiplied image signals in the vicinity of blackbody locus curve of skin color as skin color candidate pixels and pixels having the multiplied image signals in the vicinity of a blackbody locus curve of gray as gray candidate pixels;

optimizing firstly the set coefficients so that the number of the skin color candidate pixels and the gray candidate pixels is maximized and a difference between an average color temperature of the group of skin color candidate pixels and an average color temperature of the group of gray candidate pixels is minimized;

estimating a first color temperature of the photographing light source from the average color temperature of a group of skin color candidate pixels and the average color temperature of a group of gray candidate pixels obtained by the first optimization;

optimizing secondly the set coefficients so that the number of the gray candidate pixels is maximized and a difference between an average color temperature of the group of skin color candidate pixels and an average color temperature of the group of gray candidate pixels is minimized; and estimating a second color temperature of the photographing light source from the average color temperature of a group of skin color candidate pixels and the average color temperature of a group of gray candidate pixels obtained by the second optimization, and wherein the color image signals multiplied by the optimized coefficients are corrected by using both a first white balance correction signal and a second white balance correction signal, the first white balance correction signal being adapted for correcting the color image signals by a difference between the first estimated color temperature and a color temperature of reference white, and the second white balance correction signal being adapted for correcting them by a difference between the second estimated color temperature and a color temperature of reference white.

8. The white balance correction method according to claim 7, wherein only said gray and skin color information is used when correcting the image signals of the color image.

9. The white balance correction method according to claim 7, wherein, when each of the blackbody locus curve of skin color and the blackbody locus curve of gray is set, a spectral sensitivity of a photographing apparatus used to form the input color image is used as a spectral sensitivity distribution.

10. The white balance correction method according to claim 7, wherein, when each of the blackbody locus curve of skin color and the blackbody locus curve of gray is set, a spectral sensitivity of BT709 is used as a spectral sensitivity distribution.

11. A white balance correction method, comprising the steps of:

estimating, by using at least gray and/or skin color information contained in an input color image, a color temperature of a photographing light source with which the color image has been taken; and correcting image signals of the color image based on the estimated color temperature, wherein said estimating step includes:

multiplying the image signals of respective pixels in the input color image by set coefficients;

setting pixels having the multiplied image signals in the vicinity of blackbody locus curve of skin color as skin color candidate pixels and pixels having the multiplied image signals in the vicinity of a blackbody locus curve of gray as gray candidate pixels;

optimizing firstly the set coefficients so that the number of the gray candidate pixels is maximized and a difference between an average color temperature of the group of skin color candidate pixels and an average color temperature of the group of gray candidate pixels is minimized;

estimating a first color temperature of the photographing light source from the average color temperature of a group of skin color candidate pixels and the average color temperature of a group of gray candidate pixels obtained by the first optimization;

optimizing secondly the set coefficients so that the number of the skin color candidate pixels is maximized and a difference between an average color temperature of the group of skin color candidate pixels and an average color temperature of the group of gray candidate pixels is minimized;

estimating a second color temperature of the photographing light source from the average color temperature of a group of skin color candidate pixels and the average color temperature of a group of gray candidate pixels obtained by the second optimization, and wherein the color image signals multiplied by the optimized coefficients are corrected by using both a first white balance correction signal and a second white balance correction signal, the first white balance correction signal being adapted for correcting the color image signals by a difference between the first estimated color temperature and a color temperature of reference white, and the second white balance correction signal being adapted for correcting them by a difference between the second estimated color temperature and a color temperature of reference white.

12. The white balance correction method according to claim 11, wherein only said gray and skin color information is used when correcting the image signals of the color image.

13. The white balance correction method according to claim 11, wherein, when each of the blackbody locus curve of skin color and the blackbody locus curve of gray is set, a spectral sensitivity of a photographing apparatus used to form the input color image is used as a spectral sensitivity distribution.

14. The white balance correction method according to claim 11, wherein, when each of the blackbody locus curve of skin color and the blackbody locus curve of gray is set, a spectral sensitivity of BT709 is used as a spectral sensitivity distribution.

15. A white balance correction method, comprising the steps of:

estimating, by using at least gray and/or skin color information contained in an input color image, a color temperature of a photographing light source with which the color image has been taken; and correcting image signals of the color image based on the estimated color temperature, wherein the image signals of respective pixels in the input color image are multiplied by set coefficients and, as a result of the multiplication, when the coefficients are optimized so that a set objective function is minimized, a maximum value of the image signal of the input image is detected, and an image signal is used which is standardized so that the maximum value of the image signal becomes 1.0 by dividing each image signal of the input image by the maximum value.

16. The white balance correction method according to claim 15, wherein only said gray and skin color information is used when correcting the image signals of the color image.

17. The white balance correction method according to claim 15, wherein, when each of the blackbody locus curve of skin color and the blackbody locus curve of gray is set, a spectral sensitivity of a photographing apparatus used to form the input color image is used as a spectral sensitivity distribution.

18. The white balance correction method according to claim 15, wherein, when each of the blackbody locus curve of skin color and the blackbody locus curve of gray is set, a spectral sensitivity of BT709 is used as a spectral sensitivity distribution.

19. A white balance correction apparatus for correcting white balance when digital image processing is performed on an input color image to form a print, comprising:

means for estimating, by using at least gray and/or skin color information contained in the input color image, a color temperature of a photographing light source with which the color image has been taken; and means for correcting image signals of the color image based on the estimated color temperature, wherein said means for estimating a color temperature of the photographing light source includes:

coefficient multiplication means for multiplying the image signals of respective pixels in the input color image by set coefficients;

skin color candidate pixel detection means for detecting pixels having the multiplied image signals in the vicinity of a blackbody locus curve of skin color as a result of the multiplication, and gray candidate pixel detection means for detecting pixels having the multiplied image signals in the vicinity of a blackbody locus curve of gray as a result of the multiplication;

optimization means for optimizing the set coefficients so that the number of the skin color candidate pixels and the number of the gray candidate pixels are maximized and a difference between an average color temperature of the skin color candidate pixels and an average color temperature of the gray candidate pixels is minimized; and color temperature estimating and computing means for estimating the color temperature of the photographing light source for a group of skin color candidate pixels and a group of gray candidate pixels obtained by optimizing the set coefficients by the optimization means for optimizing the set coefficients in which the group of skin color candidate pixels is divided into a plurality of subgroups of skin color candidate pixels and the group of gray candidate pixels is divided into a plurality of subgroups of gray candidate pixels, and a color temperature of the photographing light source is estimated from an average color temperature of a subgroup of skin color candidate pixels with a high average color temperature among the plurality of subgroups of skin color candidate pixels and an average color temperature of a subgroup of gray candidate pixels with a high average color temperature among the plurality of subgroups of gray candidate pixels, and wherein said means for correcting the image signals of the color image is means for correcting the image signals of the color image multiplied by the optimized set coefficients by an amount corresponding to a difference between the estimated color temperature and a color temperature of reference white.

* * * * *